Aug. 11, 1925.
J. L. GOULDING
FISH NET
Filed May 28 1924
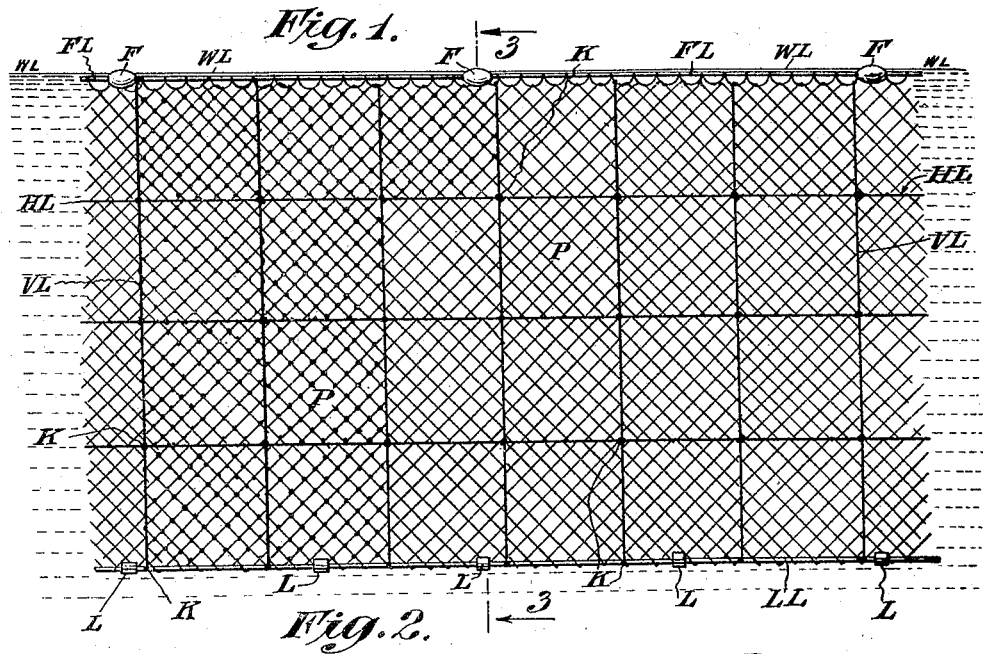
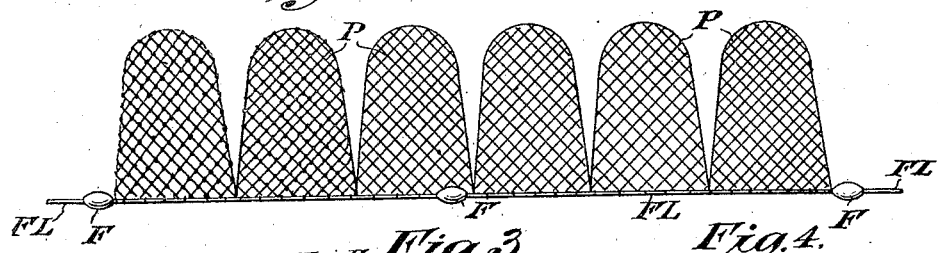
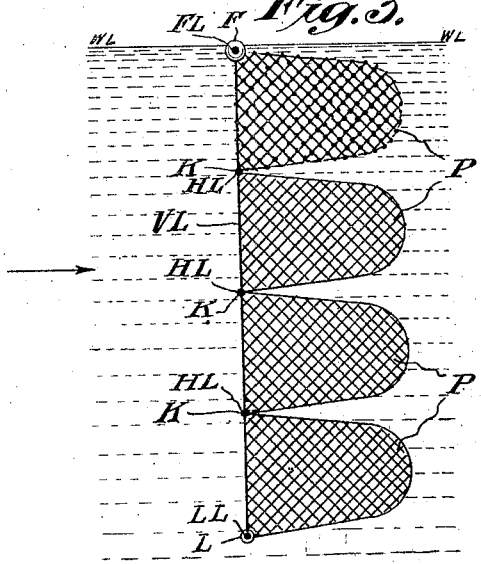
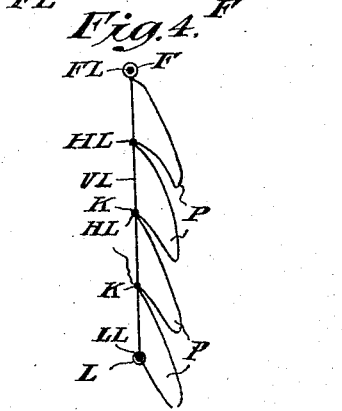
INVENTOR.
Joseph Lee Goulding
BY Philip Farnsworth
his ATTORNEY.

Patented Aug. 11, 1925.

1,548,942

UNITED STATES PATENT OFFICE.

JOSEPH LEE GOULDING, OF PUNTA GORDA, FLORIDA, ASSIGNOR OF ONE-HALF TO NORRIS CASTINE, OF FAR ROCKAWAY, LONG ISLAND, NEW YORK.

FISH NET.

Application filed May 28, 1924. Serial No. 716,295.

*To all whom it may concern:*

Be it known that I, JOSEPH LEE GOULDING, a citizen of the United States of America, and a resident of Punta Gorda, Charlotte County, Florida, have invented certain new and useful Fish Nets, the principles of which are set forth in the following specification and accompanying drawings, which disclose the form of the invention which I now consider to be the best of the various forms in which the principles of the invention may be embodied.

This invention relates to fish nets of the type adapted to catch large quantities of fish, such nets being usually from six to thirty feet deep (depending on the depth of water) and of a length from six hundred to two thousand feet and averaging about a thousand feet, according to circumstances and the desires of the fisherman.

The object of the invention is to provide a construction of net whereby less fish will be lost, less will be gilled, and a single net may be used to catch fish of various sizes in lieu of having a number of nets each having meshes adapted to gill fish of a given size.

The invention consists of substantially the construction and arrangement shown in the drawings, of which Figure 1 is a front view of a portion of the length of the improved net as it appears in use in the water;

Fig. 2 is a top plan view of the net-portion of Fig. 1;

Fig. 3 is a vertical transverse section on the line 3—3 of Fig. 1; and

Fig. 4 is a view similar to Fig. 3 but showing the normal pendant positions of the multiple pockets.

This net is an improved net of the pocket type, and while its uses are in general those of the ordinary gill net, yet its construction is such that only the smallest fish caught are gilled, the result being that most of the fish caught are in better marketable condition than fish which have been gilled. While the ends of this net can be secured to stakes and thereby held in position without float line or lead line, yet usually it will be employed with both float line and lead line and will be permitted to drift.

While Fig. 3 shows the net in use, with pockets fully distended as by a current of water, yet as ordinarily used the pockets lie pendant (Fig. 4) and in the vertical plane of the net, to assist in entrapping the fish, as explained hereinafter.

The construction is as follows: As shown, the net comprises a long and relatively narrow meshed web consisting of a multiplicity of small pockets extending in both directions of length and depth of the net, the pockets being arranged preferably in horizontal and vertical rows, as shown. These pockets are, at their mouths, about one foot square more or less, i. e., not so very much wider than the average length of fish which the net is designed to catch, although several fish may become entrapped in each pocket.

The net shown is one of the shallowest, being of the slightest depths employed, only four vertically-arranged pockets being shown; but when a deeper net is used as customarily, the number of pockets in each vertical row will be more than that shown, up to say thirty pockets for a net approximately thirty feet deep. The limitation of four vertical pockets shown is due only to limitation of space on the drawing page. In Fig. 1, the ends of the long net are broken away, but in the average net of several hundred feet in length there will be approximately several hundreds of pockets in each horizontal row.

Each of the pockets P preferably is independently knitted to have the preferable pocket-shape shown in Figs. 2 and 3, such knitting being effected by any of the well-known knitting methods for giving a pocket or preferably the funnel shape shown.

The meshes of the pockets and the net as a whole preferably are small, i. e., they may be as small as a two-inch mesh more or less,—the idea being, in connection with the multiplicity of pockets, to catch edible fish of all sizes with the minimum of gilling, i. e., the meshes being so small as to gill only the smallest fish, and to catch by body entanglement practically all of the fish of desirable sizes.

In the example disclosed, the net is provided with the usual float line FL equipped with cork floats F, and with the ordinary lead line LL provided with weights L. A method of assembly of the multiplicity of pockets is as follows, as shown. The float line FL and lead line LL are laid out on the floor parallel to one another at a distance from one another corresponding with the depth of the completed net. Thereupon the multiplicity of previously knitted pockets P are laid on the floor in the locations they are to have in the completed net; the top horizontal row of pockets having the meshes of their upper sides threaded on the float line; and the bottom horizontal row of pockets having the meshes of their bottoms sides threaded by the lead line; and the floats F and leads L being strung on the float- and lead-lines respectively at desired intervals and interposed along the successive pockets. Next, the vertical lines VL, succesively, are secured at one set of ends to, say, the float line FL. Each vertical line or cord VL is then threaded, throughout its length, through the meshes of adjacent vertical sides of two adjacent vertical rows of pockets P. Preferably, as shown, the line VL is threaded first through a mesh of a vertical side of a pocket in one vertical row, and then through a mesh of the adjacent side of the adjacent pocket in an adjacent row.

The horizontal lines HL are threaded or interwoven with horizontal adjacent sides of pockets P of adjacent horizontal rows in a manner similar to that above described in respect of vertical lines VL.

Preferably, at the corners of each pocket P, the horizontal lines HL and the vertical lines VL are knotted together as shown at K. This gives a slight desirable rigidity to the entire net structure (maintaining a permanent assembly of the horizontal and vertical supporting lines) which holds together the multiplicity of small pockets; but such slight rigidity does not interfere with the desired give-and-take movements of the sides of the pockets and the consequent entangling action of the pockets on the fish to be described; that is, the meshes of a given pocket, along the sides of the mouth thereof, through which the vertical and horizontal lines pass, are free to slide along the vertical and horizontal lines; and the portions of the horizontal and vertical lines which support the sides of the pocket also are free to yield laterally under movements of a fish in a pocket so as to contract the pocket mouth and prevent the escape of the fish by its turning around just previous to its becoming entangled in the flexible portions of the pocket remote from the pocket mouth.

In the case of nets designed to be held in place between stakes, and not provided with float line FL or lead line LL, said float- and lead-lines will be replaced by ordinary horizontal lines HL.

The result of this construction (with pockets pendant in the plane of the horizontal and vertical lines, Fig. 4) is a net of the area of an ordinary gill net, but consisting of an assembly of pockets, of which a plurality are disposed vertically and a plurality horizontally, each pocket being of comparatively small mouth-diameter, i. e., preferably narrower than the length of the fish to be caught; and the entire net having comparatively small meshes. Also preferably the length of the pocket, from mouth to closed end, is at least as great as the length of the fish to be caught.

The invention is embodied in a net having the described multiplicity of small pockets, independently of the particular method of construction, although the above-described construction is preferred, i. e., involving the horizontal and vertical supporting lines.

In the use of this net, the pockets P hang more or less downwardly in the plane of the net (Fig. 4), as distinguished from the very unusual condition shown in Fig. 3 which might result from an unusually strong current, and a condition least efficient as to the entangled action of the multiple pockets. This operative condition of the net (Fig. 4) is not shown in Fig. 1 on account of the practical impossibility of making such a showing in side elevation. Fig. 1 merely indicates the mouths or entrances of the pockets between the four square sides of the pocket-mouth, which is the condition when the net as a whole is distended in use. The open mouths of pockets P lie facing the arrow in Fig. 3 which may be taken to indicate the direction of approach of the fish toward the net. Plainly, the contiguous wide open mouths of the multiplicity of pockets (notwithstanding the pendant portions of the pockets which hang behind the mouths of pockets beneath them) provide an area extending the entire width and length of the net, all of which area is subject to entrance by the fish (through the mouths of the adjacent multiplicity of pockets), as if, so far as this is concerned, there were no pockets whatever or the net were actually a gill net. But immediately upon a fish passing beyond vertical and horizontal lines VL and into the mouth of a pocket, his nose engages against the pendant portion of the particular pocket P in which the fish enters. Thereupon ensues a very different action from that in any fish net heretofore devised, particularly owing to the small size of the pockets as compared with pocket nets heretofore devised. The pendant portion of the pocket offers practically no resistance to the further progress of the fish. A fish cannot move backwards, and on feeling the slight pressure of the pendant pocket meshes, the fish either continues farther forward motion, under way, lifting the pendant pocket, or else starts to turn around, or makes a little of both movements. As indicated in Figs. 2 and 3, the pockets have a depth, from mouths to closed ends, which is somewhat greater than the diameter of the mouth, more or less, in order to accommodate at least the full length of the fish including the tail. That is, the length of the pocket preferably exceeds the length of the fish, but the diameter of the mouth of the pocket preferably is less than the length of the fish. As the fish struggles with its nose against the closed side or end of the pocket, exerting a strain on the pocket, the sides of the mouth of the individual pocket contract by the sliding of the meshes along the vertical and horizontal supporting lines VL and HL, with the result that the mouth-opening diminishes and the diameter of the pocket throughout its length diminishes, and the lines VL and HL at the sides of the pocket yield, all thereby tending to envelop the fish and make it practically impossible for it to turn around and escape even through the contracted mouth of the pocket. The result is that the fish becomes so entangled in the pocket net that he is actually substantially as well entrapped as if there were no open mouth to the pocket. A reason for the small diameter of the pocket mouth, i. e., preferably less than the length of the fish designed to be caught, is to assist in entanglement and entrapping by making it extremely difficult for the fish to turn around and escape. Also the smaller diameter of the closed ends of the pockets (as compared with the mouths thereof) assists in the entrapping. The multiple small-pocket construction, in effect, permits a give-and-take of each individual pocket portion of the net, thereby contributing to the entanglement. The freedom of movement of the parts of the comparatively small pockets is more particularly emphasized in the intermediate portions of the net between the float line and lead line, in which intermediate portion there is a greater extent of give-and-take slack of the horizontal lines HL and vertical lines VL which is additional to the freedom of movement permitted by the sliding of the sides of the meshed pockets on said horizontal and vertical lines.

The above entrapping is effected without any gilling save of fish so small as to get their gills through the small meshes of the net. Preferably, the meshes are so small as to avoid gilling all but the smallest fish. On the other hand, the pockets and their mouths preferably are sufficiently large to entrap the largest sizes of edible fish.

It is not necessary that the top of the net be at or about water level WL, as shown in Fig. 1; for the top of the net may be held down, by heavily leading the net at the bottom, twenty or twenty-five feet below water level in cases of considerable boat traffic.

The combination of the multiplicity of small pockets, with the small mesh of the net, has two important practical advantages, i. e., (1) efficiency in entrapping all fish, and (2) economy in providing a single net which will catch all desired sizes of fish instead of the necessity prior to my invention of a fisherman's owning and employing half a dozen or more ordinary nets, each having a different size mesh, to gill various sizes of fish.

The advantage of having a single net for all sizes of edible fish is sufficiently obvious. A single net of my construction, for example, may be used in lieu of half a dozen nets, more or less, of various size mesh, running from a two-inch mesh, through two and one-half, two and three-quarters, three, three and a half, four and four and one-half, up to eight or nine inch mesh for the larger edible fish.

The efficiency of my net in catching fish is not so clear as the advantage of economy in nets. The fact is that with the ordinary gill net, generally twenty per cent of the fish engaging the net are lost. Many fish engaging a gill net at slow speed, and feeling the net without being gilled, turn, swim along the net and pass around its ends. Also in a gill net fish are held, at least for a time, either by actually gilling, or by "nosing" where the fish is held in the net by its nose. When a portion of a gill net is lifted to remove the fish to the boat, the "nosed" fish frequently are lost. Also the gilled fish, in removal, frequently are lost. Other and strong fish are lost through breaking through the meshes of a defective net, as by struggling forward after being gilled. Also in a gill net (which, of course, has meshes large enough to gill the fish), the smaller fish pass through such meshes and they also are lost, and the fish are not caught which are larger than a net of a given mesh. This accounts for such large loss of fish which have engaged more or less in the ordinary gill net, lacking the entangling means of my pocket net. In my net, as stated, only the smallest fish are gilled, and most of the catch lies entangled in the pockets, so that when the successive portions of the net are lifted alongside the boat, the fish in the pockets readily can be dumped into the boat, without loss of the fish and without the trouble of removing gilled fish.

I am aware that it is not new to provide a gill net with pockets, as the same is shown, for example, in the United States patent to Fox 1,016,881, dated 6 February, 1912. But, in the first place, my net substantially is not a gill net. And my net plainly differs from said gill net in the essential respects pointed out in the appended claims; and my net has the two above-specified features of important utility, neither of which is possessed by said gill net.

I particularly point out and distinctly claim the part, improvement, or combination which I claim as my invention or discovery, as follows:—

1. An entangling pocketed fish net comprising a small-meshed web which is long and relatively narrow and is formed with horizontally and vertically extending rows of individually-separate pockets formed with mouths and depths of dimensions of the general order of magnitude of the lengths of the fish to be caught; and horizontal and vertical supporting lines threaded through side meshes of adjacent pockets.

2. An entangling pocketed fish-net which comprises a long and relatively narrow web consisting of a multiplicity or individually-separate small-meshed pockets arranged in horizontal and vertical rows and having entrance openings on one side surface of the net; and horizontal and vertical supporting lines holding together in the net the horizontally-adjacent and vertically-adjacent pockets of said respective pocket-rows.

3. An entangling pocketed fish-net comprising a web consisting of a multiplicity of individually-separate meshed pockets, and horizontal and vertical supporting lines holding said pockets together in said web; said pockets having mouths and lengths of substantially the general order of magnitude as the fish desired to be caught.

4. An entangling pocketed fish-net comprising a multiplicity of individually-separate meshed pockets, and lines supporting adjacent sides of adjacent pockets and threaded alternately through a side mesh of one pocket and a side mesh of the adjacent pocket.

5. An entangling pocketed fish-net comprising a multiplicity of individually-separate meshed pockets arranged in horizontal and vertical rows; and horizontal and vertical lines holding adjacent pockets together and threaded through the side meshes of adjacent pockets.

6. An entangling pocketed fish-net comprising a multiplicity of individually-separate meshed pockets arranged in vertical and horizontal rows; and horizontal and vertical lines holding adjacent pockets together and threaded through the side meshes of adjacent pockets; said supporting lines being knotted together at the junctions of the vertically-adjacent and horizontally-adjacent pockets.

7. An entangling pocketed fish-net comprising a multiplicity of individually-separate meshed pockets arranged in vertical and horizontal rows; and vertical and horizontal lines holding adjacent pockets together, and threaded alternately through a side mesh of one pocket and a side mesh of an adjacent pocket, said supporting lines being knotted together at the junctions of the vertically adjacent and horizontally adjacent pockets.

JOSEPH LEE $\overset{\text{his}}{\times}$ GOULDING.
mark

Witnesses:
J. E. SKIPPER,
S. F. J. TRABUE.